April 29, 1947. G. T. HART, JR 2,419,641
PHOTOELECTRIC LINE-FOLLOWING APPARATUS
Filed Feb. 22, 1944 4 Sheets-Sheet 1

Inventor
George T. Hart, Jr.
By his Attorney

Inventor
George T. Hart, Jr.
By his Attorney

Patented Apr. 29, 1947

2,419,641

UNITED STATES PATENT OFFICE 2,419,641

PHOTOELECTRIC LINE-FOLLOWING APPARATUS

George T. Hart, Jr., Lynn, Mass., assignor to United Shoe Machinery Corporation, Flemington, N. J., a corporation of New Jersey Application February 22, 1944, Serial No. 523,495

10 Claims. (Cl. 250—41.5)

This invention relates to line-following, or tracking, apparatus and more particularly to one in which the tracking is accomplished by means of a photoelectric device.

Devices for line-tracking have numerous applications, one of the more usual of which involves the tracking of an object or prepared pattern having a line or contour and the reproduction of that pattern line, usually on another material with such modifications as to size, or the like, which it may be desired to introduce. Further, having an apparatus including a movable follower or tracking device which, by combined photoelectric and mechanical means, will automatically follow a prepared pattern or contour, then, the departure of that follower from normal may readily be transmitted and utilized for such abstract results as mathematical computations or for such concrete results as the performance of useful work in, for example, the cutting of the shape of the pattern in a piece of work. It is common, for example, to connect such a tracking device with a working tool by means of a pantographic mechanism, and such mechanisms readily lend themselves to the grading of the original pattern so that the work produced may be either the same size as the pattern, or smaller or larger than that pattern.

Most line-tracking devices of this type depend upon the action of a single photoelectric cell the effect of which is balanced against a mechanical force to cause the cell to track one side of the line of the pattern in question. There is a tendency toward overcorrection in such arrangements, however, since no change is produced until the tracking device leaves its normal position with respect to the line, and, if they are rendered highly sensitive to changes, there is the likelihood that hunting will be set up, which will render it difficult to track the line expeditiously and accurately. If, then, the power apparatus which causes the relative progressive forward movement is set to operate at speeds which are suitable for smooth contours, it will overshoot and will not accurately follow ragged or irregular contours.

Accordingly, an object of my invention is to provide, in such a tracking apparatus, a predicting or pilot mechanism which will note the approach of abrupt changes of contour and act accordingly.

A feature of the invention resides in the utilization of a pilot device, herein illustrated as a predicting photocell, for altering the speed of the power mechanism which causes the progressive tracking movement and, as illustrated, will slow down that movement when abrupt changes in contour are noted.

This and other features of the invention will best be understood from a consideration of the following description taken in connection with the accompanying drawing, in which Fig. 1 is a plan view of a line-following and reproducing apparatus;

Figure 1:
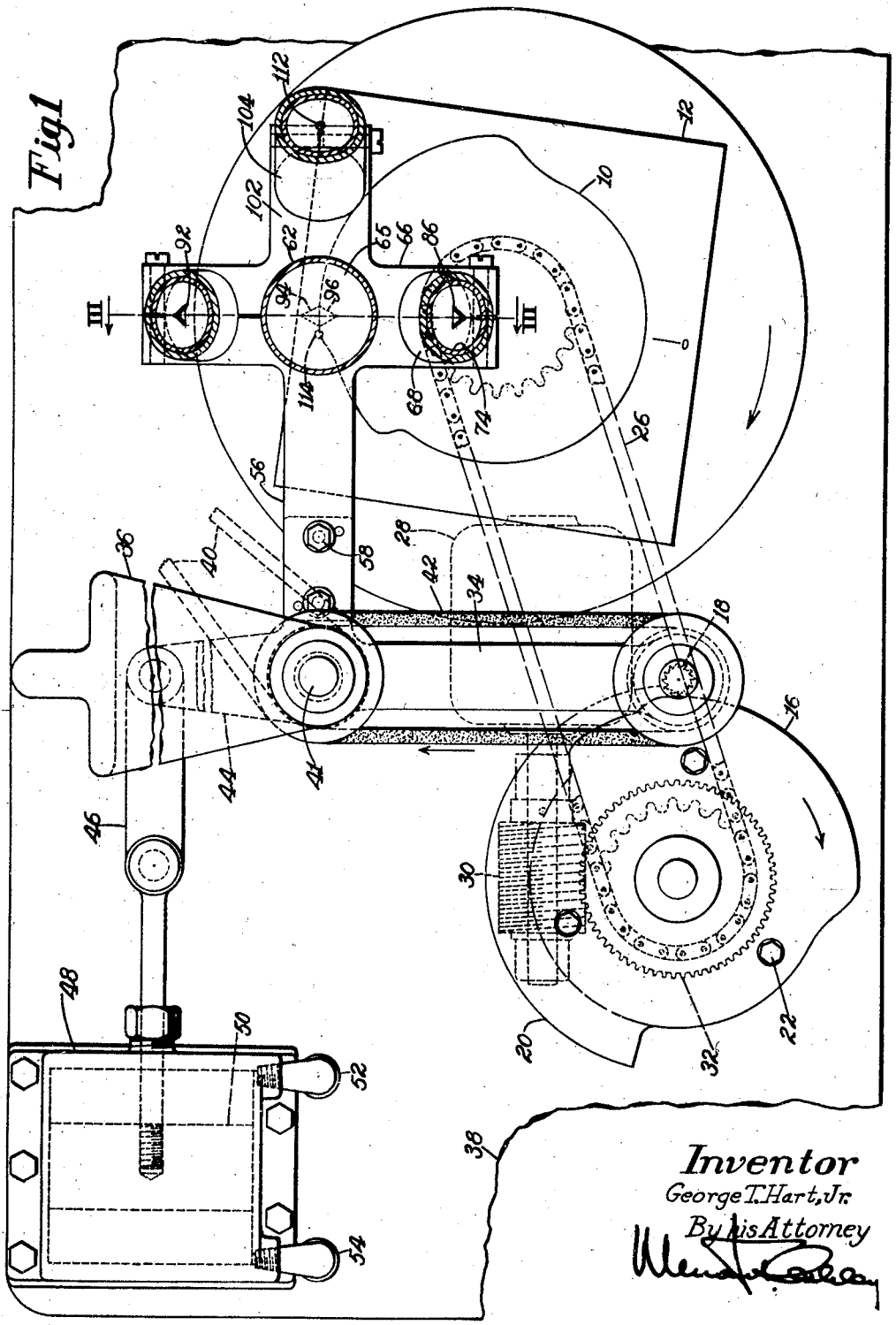
Figure 2:
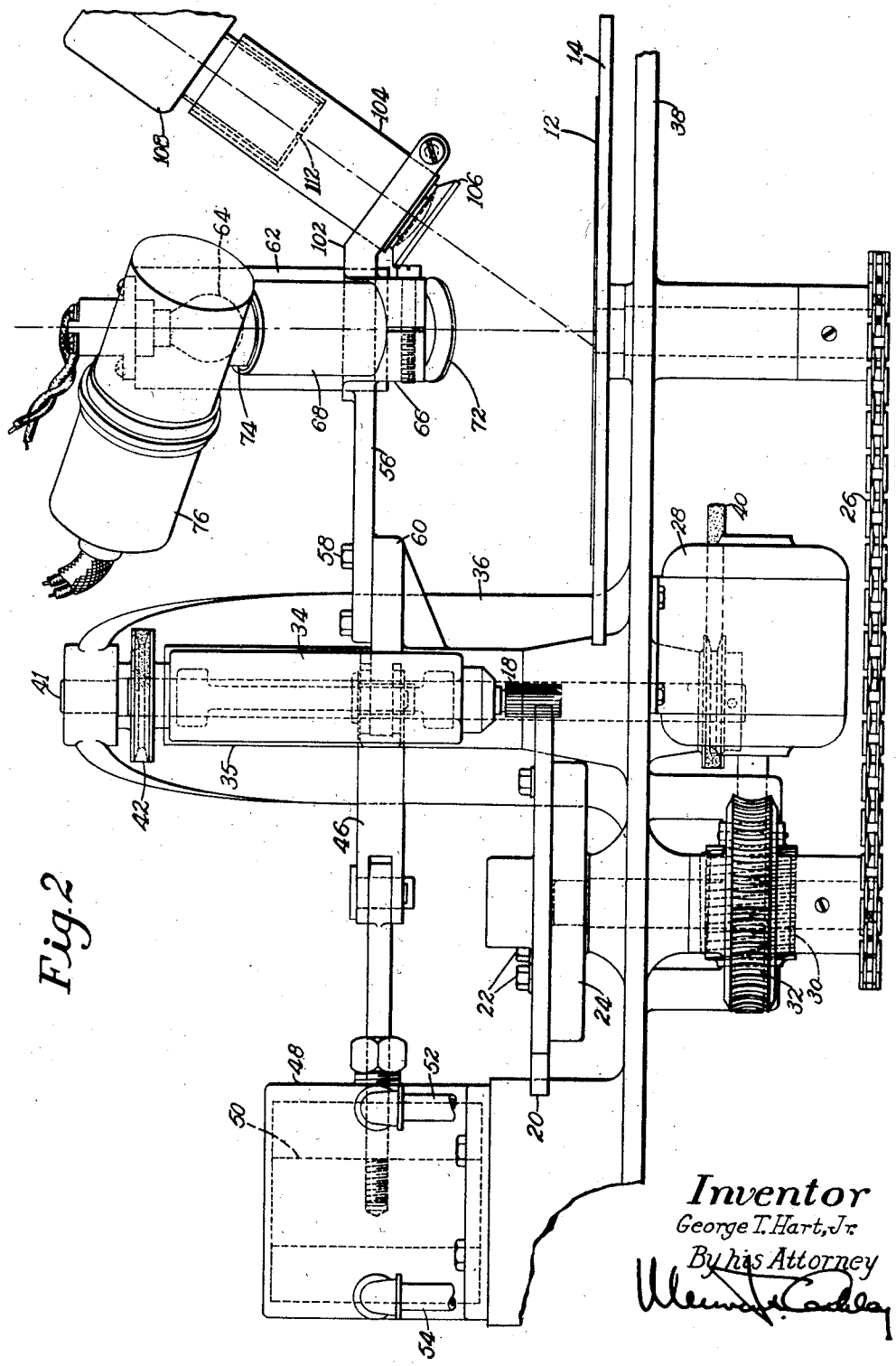
Fig. 2 is a side elevation of this same apparatus.

For the sake of simplicity, the contour to be tracked is shown as an endless curve delineated by a line 10 (Fig. 1) contrasting with a lighter sheet 12 which is secured in any desired fashion upon a rotatable table 14. Provision for reproducing the contour 10 is illustrated as the cutting of an outline or disc cam 16. This is cut by a rotatable milling tool 18 from a sheet of metal 20 which is attached by bolts 22 to a rotatably mounted work support 24 (Fig. 2). The work support and the table 14 are interconnected by a chain 26 running over suitable sprockets and, together, they are driven by means of a variable speed electric motor 28 connected to the work support 24 by a worm 30 and a worm gear 32. The tool 18 is rotatably mounted in the arm 34 of a bell-crank lever having a hub 35 which is pivotally supported in a bracket 36 extending upwardly from a base 38. The tool is arranged to be driven, independently of its position, from any source of power (not shown) through a belt 40 leading to a pulley on the bottom of a spindle 41 on which the hub 35 swings, and this spindle is connected to the tool shaft by means of pulleys at the top of the spindle and tool shaft, connected by a belt 42. The hub of the bell-crank supporting lever has an arm 44 which is connected by a link 46 to a hydraulic motor 48 having a piston 50 within a cylinder the opposite ends of which are supplied with fluid, as desired, through pipes 52 and 54.

Figure 3:
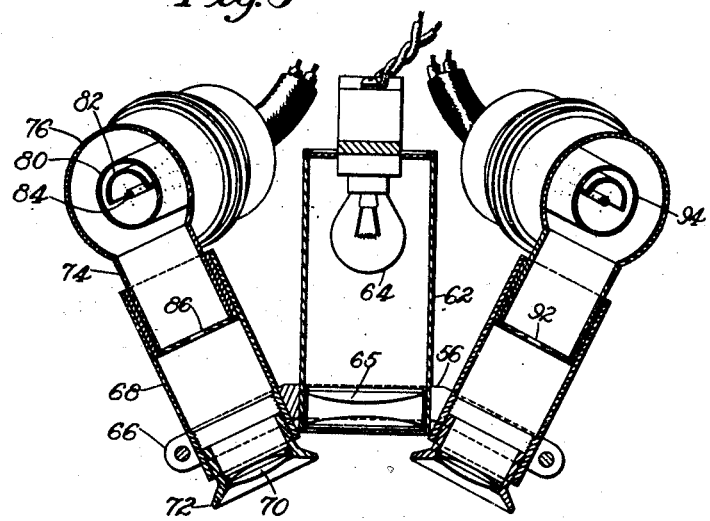
Fig. 3 is a vertical section on the line III—III of Fig. 1.
Figure 4:
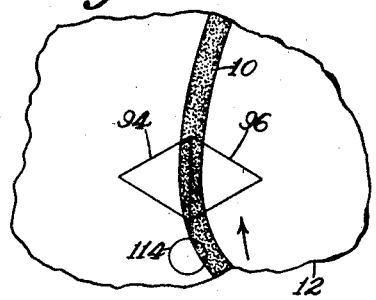
Fig. 4 is a diagrammatic view, indicating the relation between the fields scanned by the tracking device and that observed by the predicting device.

The control of this hydraulic motor is effected, in a manner to be later described, in response to the observations of a tracking device mounted on a frame 56 which is secured by dowels and screws 58 to an arm 60 also forming a part of the bell-crank lever. The frame 56 of the tracking device is, as may be seen from Fig. 1, in the form of a cross at the intersection of which there is supported a casing 62 for an electric lamp 64 (Fig. 3). The light passes through condensing lenses 65 so that the field of the pattern at the point of observation is brightly illuminated. At the ends of the transverse arm of the cross-like support 56, there are downwardly-bent portions 66 (Fig. 3) in which are clamped casings 68 containing convex lenses 70 each mounted within a sleeve 72. These sleeves are threaded in the casings 68 to permit the lenses to be adjusted to secure a bright and uniform image. At the top of the casing, there is inserted a projecting portion 74 of a casing 76 in which there is carried a photocell 80 having a curved cathode plate 82 and a rod-like anode 84. At the lower end of the extension 74, which frictionally fits in the casing 68 to permit of adjustment, is a triangular diaphragm opening 86. The casing for the other photocell 90 has in its similar diaphragm a triangular opening 92, and it will be observed that the angle of projection is such that the limited areas 94 and 96 observed by the tubes 90 and 80, respectively, are equal triangles arranged, when the contour is delineated by a dark line on a light sheet, with the bases coinciding (Fig. 4). In tracking, it is desired to keep the support 58 in a normal or neutral position such that half of the width of the contour line lies in each area. By this arrangement, the effect upon the respective photocells of even a small deviation of the line with respect to the lighted areas 94 and 96 is very marked since relative transverse movement between the line and these areas greatly increases the illumination of one of the cells and sharply reduces that of the other cell.

As has been noted above, a tracking device of this general nature can only become active to correct a diversion from the desired contour after the diversion has occurred. This being true, if the speed of progressive tracking movement is well adapted for the following of smooth contours, it may not be well adapted for following contours where there are abrupt changes or where the degree of irregularity of the contour is marked. To offset this difficulty, a pilot device is provided which tracks the contour ahead of the aforementioned tracking device and which is responsive to conditions in a forward area. If this device notes abrupt changes in the contour so that a change in speed of progressive movement is indicated, it acts accordingly. The pilot device or predictor is of the light sensitive or photoelectric type and is illustrated as carried on the support 56 which is utilized for the tracking device. This support has at the head of its cross-shaped member another downwardly-bent clamping portion 102 (Fig. 2) in which there is supported a casing 104 having a threaded sleeve 106 similar to the sleeve 72 and similarly containing a focusing convex lens. In the casing 104 there is also a casing 108 for a predicting or pilot photocell 110 which has a diaphragm perforated by a small circular opening 112. The disposition of this predicting photocell 110 is such that its area of observation 114 (Figs. 1 and 4) is forward of the areas 94 and 96, having regard to the direction of relative progressive movement indicated by the arrows in Figs. 1 and 4. It will be understood that this relative progressive movement is, in this case, caused by the action of the motor 28 in turning the table 14 so that the areas of observation are carried to successive positions along the length of the contour to be tracked. In other mountings, the contour sheet 12 might remain stationary and the tracking apparatus be given a progressive movement.

Figure 5:
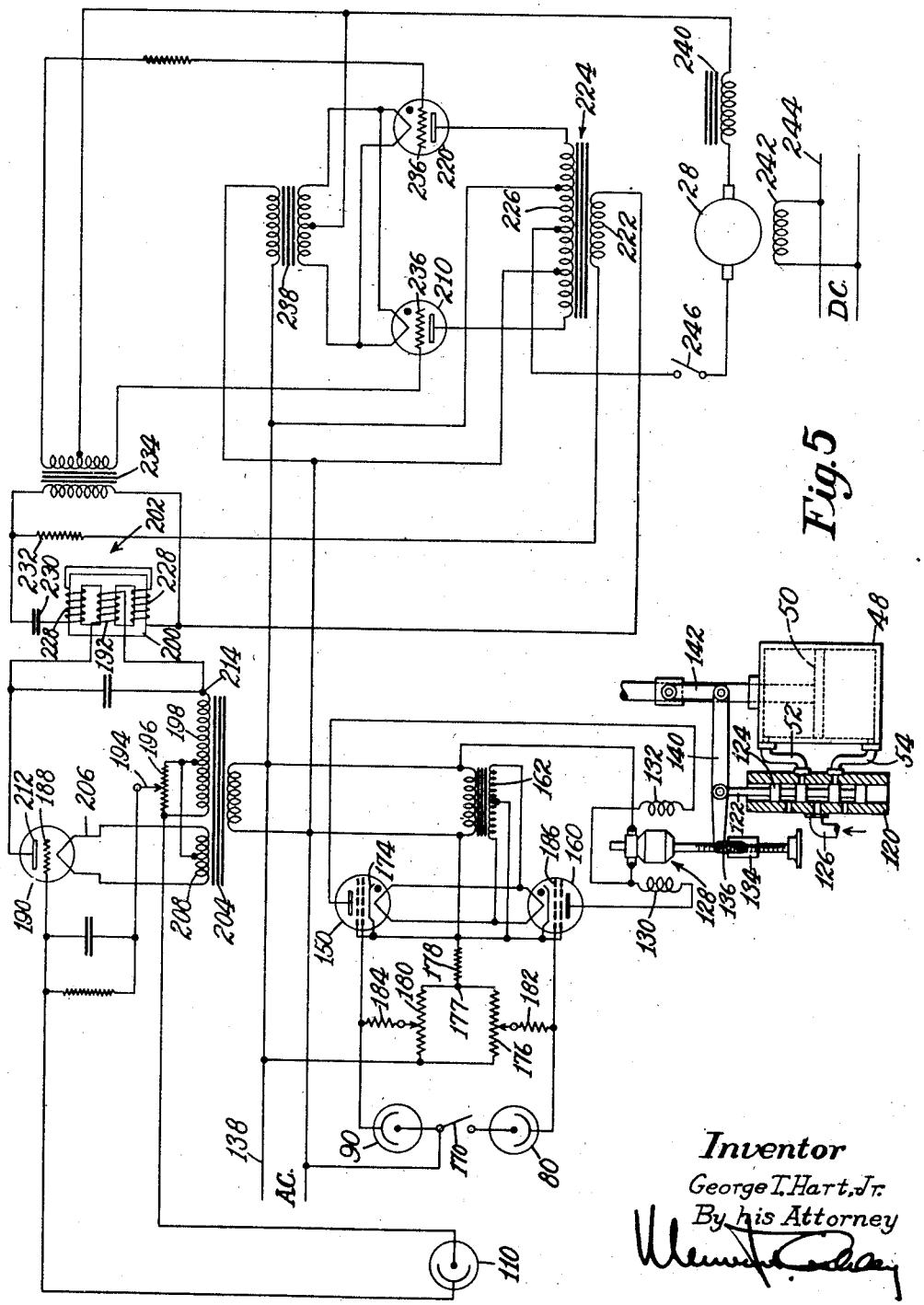
Fig. 5 is a circuit diagram, illustrating one way in which the photocells may be caused to control the mechanical movement of the parts of the mechanism.

The control of the hydraulic motor to produce transverse movements of the tracking device support 56 to keep the common base of the areas 94 and 96 centered on the outline or contour 10 is effected by an arrangement, illustrated diagrammatically in Fig. 5, in which it will be seen that the supply of fluid to the pipes 52 and 54 is controlled by a slide valve 120 comprising a cylinder provided with suitable ports and in which there is movable a piston 122 having successive lands, or enlargements, such as that shown at 124. Movement of the valve piston downwardly in Fig. 5, for example, results in the passage of fluid from a supply pipe 126 to the pipe 54 thereby producing movement of the piston 50 to carry the cutter 18 toward the center of the work support and, similarly, to carry the photocells inwardly of the revolving table 14. The movements of the valve piston 122 are effected by a reversible electric motor 128 having field windings 130 and 132. The shaft of the motor 128 is threaded in a nut 134 which is joined by a link 136 to one end of a follow-up lever 140. An intermediate point of this lever is pivotally connected to the valve piston 122 while the other end thereof is joined by a link 142 to the piston 50 of the hydraulic motor 48. Thus, the action of the electric motor 128 is to displace the piston 122 until fluid is supplied to the hydraulic motor through one or the other of pipes 52, 54. As soon, then, as the piston 50 of this motor has been moved to the desired extent, it will react upon the follow-up lever 140 to return the valve piston 122 to neutral position, whereupon the motor 48 will stop and, since the support 58 will thereby have been returned to its neutral position above the contour 10, the cells 80 and 90 will, as later described, no longer supply current to the motor 128 and that will also stop.

These field windings 130 and 132 are supplied with current from alternating current mains 138 through five-element gas-filled tubes such as Thyratrons 150 and 160 the heaters of which are supplied from a secondary 162 of a transformer connected across these mains. These tubes 150 and 160 may be of the type designated by the number "2050" and they permit the passage of current between the cathode and anode after the grid bias has been adjusted (rendered less negative) by the associated photocell. The cathodes 174 of the tubes are connected to a mid-point on the secondary 162 and to one side of the alternating current mains 138. They are also connected through a resistance 178 to a mid-point 177 between the potentiometers 176, 180 connected in parallel and with their far ends connected to the other side of the alternating current mains, and the curved cathodes of the photocells 80 and 90 are connected through suitable resistances 182 and 184 to the adjustable contact arms resting on these potentiometers. These cathodes are also connected to the grids 186 of the respective tubes, with the result that, when the illumination of one of the photocells is great enough, as adjusted, to reduce the negative grid bias of its corresponding tube 150 or 160 to a point where the latter becomes conductive, a unidirectional pulsating current will be supplied to one of the field windings and to the armature of the motor 128, causing it to adjust the valve 120 until the hydraulic motor 48 restores the support 56 to a position above the contour 10 such that the effect between the cells is balanced.

Although the pattern described above comprises a black line upon a light background, it is clear that the line-tracking device can be utilized for patterns having a light line upon a dark background. When that is the case, a correct operation of the machine may be effected by reversing the apertures 86 and 92 in the diaphragms so that the triangular areas 94 and 96 are disposed apex to apex with the meeting point above the center of the contour 10. With slight modifications, it can also be used for a pattern in which the line to be followed is the contour of a piece of sheet material, the color of which contrasts with the background of the support. In some cases, it may be found desirable to scan such a contour by placing the illuminating device above or below a translucent support carrying an opaque pattern, for example, and the photocells upon the other side of that device, in much the manner illustrated in United States Letters Patent No. 2,259,502, granted October 21, 1941, upon the application of Topham et al.

Whatever the actual form of the tracking device which is required by the pattern to be used, there will be associated with, and usually mounted for movement with, the tracking device, the predicting photocell 110. This predictor is associated with an amplifier tube 190 to supply unidirectional current to one winding 192 of a saturable reactance 200, the other winding 228 of which forms part of a phase-shifting device 202, thereby to control the current delivered by gas-filled tubes such as Thyratrons 210 and 220 to the drive motor 28 and hence to control its speed of operation. The operation of this combination of parts depends upon the fact that the area 114 which is observed by the predicting cell 110 will, when the contour 10 changes abruptly, start to leave the contour and be on the lighter paper of the drawing 12 (Fig. 4). This increased illumination is made effective to slow down the speed of the driving motor 28 to permit the line-tracking device to reach its adjusted position without undue delay as from overcorrection or hunting.

The connection of the cell 110 is similar to that of the cells 80 and 90, and it will be noted that the anode of the cell is joined to the grid 188 of the amplifier tube 190 and to an adjustable contact member 194 resting on a potentiometer 196 which is supplied from one portion of a secondary winding 198 of a transformer 204 supplied from the mains 138. The cathode 206 is supplied from a secondary winding 208 the mid-point of which is connected to the mid-point of the winding 198.

The winding 192 of the saturable reactance 200 is connected from the anode 212 of this tube 190 to the end 214 of the transformer secondary winding 198. When, therefore, the illumination of the predictor photocell 110 is increased, a current will flow in the winding 192, tending to saturate the core of the reactance 200 and thus permitting a flow of current from the secondary winding 222 of a transformer 224, the primary winding 226 of which is supplied from the mains 138, through the phase shifter 202. The latter comprises the reactance winding 228, a condenser 230 and a resistance 232 to vary the phase of the grid voltage, with respect to the anode voltage, as supplied through the transformer 234 to the grids 236 of the tubes 210 and 220. These are preferably of the gas-filled type and have cathodes supplied through a transformer 238, while their anodes are connected to opposite ends of the primary winding 226. It is thus possible in well-understood fashion to control the electric energy applied to the armature of the direct current motor 28 which is connected in series with an inductance 240 between a mid-point on the primary winding 226 and a mid-point on the secondary windings of the grid transformer 234 and the filament transformer 238, thus receiving more or less of a full-wave-rectified, pulsating current. The field winding 242 of the motor is supplied from direct current mains 244, and the purpose of the inductance 240 is to avoid an overload on the tubes.

At the beginning of the cutting operation upon the blank 20, it will be impossible to position the line-tracking device above the line until the cutter 18 has swung in to the edge of the blank and has nearly reached the desired periphery of the cam 16. To bring this about, a switch 170 is provided in circuit with the photocell 80 so that the photocell 90 shall be continually effective to cause operation of the hydraulic motor 48 in the direction to swing the cutter inwardly to a point such that the accompanying arm 56 also carries the tracking device and the lamp 64 to a point where the illumination produced by the latter is substantially centralized above the contour 10. The switch 170 may then be closed, leaving the mechanism to track the contour automatically. A switch 246 may then be closed to start the motor 28.

Having described my invention, what I claim as new and desire to secure by Letters Patent of the United States is:

1. In an apparatus for tracking the contour of a predetermined outline, a tracking device, a support for the outline to be tracked, power means for causing relative progressive movement between the tracking device and the outline, photoelectrically controlled power means for maintaining the tracking device adjacent to one portion of the outline, a pilot tracking device responsive to another portion of the outline ahead of said first portion, and means under the control of the pilot device for determining the speed of operation of one of said power means in accordance with the abruptness of changes of direction of the outline.

2. In an apparatus for tracking a contour, a support for an object having a contour to be tracked, a contour tracking device, a movable support therefor, power means for moving the support laterally of the contour to hold the tracking device on the contour, a photoelectric tube controlling said power means, power means for effecting relative movement between said supports to effect relative progressive motion between the tracking device and the contour, and a mechanism including a photoelectric tube controlling said second power device.

3. In an apparatus for tracking the contour of a predetermined outline, a tracking device and a support for the outline to be tracked mounted for relative movement to effect progressive tracking, a feed motor for causing relative progressive motion between the tracking device and the outline, a pilot electronic scanning device also mounted to follow said outline, and means under the control of the pilot device for altering the speed of the feed motor in accordance with the abruptness of changes of direction of the outline.

4. In an apparatus for tracking a contour, a support for an object having a contour to be tracked, a photoelectrically controlled contour tracking device, a support therefor, a feed motor for effecting relative movement between said supports to permit said tracking device to track the contour, a photoelectric pilot device, and means under the control of the pilot device for altering the speed of the feed motor in response to the abruptness of changes of contour.

5. In an apparatus for tracking the contour of a pattern, a tracking device including a photoelectric device mounted to observe an area on said contour, means for supporting said tracking device and said pattern for relative movement of progression to cause the observation of successive portions of the contour and for relative movement laterally of the contour to permit the tracking device to follow the contour, power means for producing said movements, means responsive to the deviation between the contour and the point observed by the tracking device for causing the power means to return the tracking device to a position close to the contour, a predictor associated with said tracking device, said predictor including a photoelectric device mounted to observe an area on said contour in advance of that observed by said tracking device, and means responsive to deviations between the area observed by the predictor and said contour for regulating the action of the power means.

6. In an apparatus for tracking a pattern including a line, a line-tracking device including photoelectric means, said tracking device being mounted for lateral movement with respect to the line, power means controlled by the tracking device arranged to move it laterally to return the tracking device to a position close to the line, power means for producing relative progressive movement between the tracking device and the pattern to permit successive portions of the line to be scanned by the tracking device, a predictor mounted for movement with the tracking device, said predictor embodying photoelectric means for scanning an area adjacent to the line in advance of the tracking device, and means, responsive to deviations between the area observed by the predictor and said line, controlling the rate of action of one of said power means.

7. In an apparatus for tracking a pattern having a line, a movable support for said pattern, power means for moving said support, a tracking device mounted for lateral movement with respect to the line, said tracking device embodying photoelectric means for scanning successive portions of the line as the support is moved, power means controlled by said photoelectric means for effecting the lateral movements of the tracking device to hold on the line the point observed thereby as successive portions are observed, a predictor movable with the tracking device including photoelectric means arranged to observe a portion of the line adjacent to the point observed by the tracking device but spaced therefrom along the line, and means responsive to said predictor for affecting the speed of one of said power means.

8. In an apparatus for tracking a pattern having a closed outline, a rotatable support for said pattern, power means for rotating said support, a tracking device including photoelectric means mounted for lateral movement substantially radially of said support to permit the tracking device to follow the outline as successive portions of it are scanned, power means responsive to the photoelectric means acting upon said tracking device to cause said lateral movement thereby to hold the area observed by the tracking device adjacent to said outline, a photoelectric predictor mounted for movement with the tracking device and arranged to observe an area including a portion of the outline close to and in advance of the area observed by the tracking device, and means responsive to the observations of said predictor for slowing the action of the power means which rotates the support when the area observed by the predictor diverges radically from the outline.

9. In an apparatus for tracking an outline, a support for an object having an outline to be tracked, interconnected differentially - acting photocells arranged to observe limited areas at the outline, a support therefor, means permitting a relative transverse movement between the cell support and the object support, means controlled by said photocells for effecting said relative transverse movement and arranged to follow the outline, means for effecting relative progressive movement between the object and the photocells along the outline to be tracked, a third photocell, means for restricting the area observed by said photocell to a position adjacent to but spaced forwardly of the areas observed by the other photocells, and means controlled by said third cell for altering the speed of the progressive movement.

10. In an apparatus for tracking a curve, a rotatable table for supporting an object having a curve, means for rotating said table, a movable support, a photocell on said support, means for restricting the area observed by the photocell to a position adjacent to said curve, a predicting photocell also mounted on said support, means for restricting the area observed by said predicting cell to an area adjacent to and forward of said previously-mentioned area having regard to the direction of rotation of said table, means controlled by said first photocell for moving the photocell support to cause the cell to track the line, and means controlled by said predicting cell for changing the speed of rotation of the table when the area observed by it tends to leave the line.

GEORGE T. HART, Jr.

REFERENCES CITED

The following references are of record in the file of this patent:

UNITED STATES PATENTS

| Number | Name | Date |
| --- | --- | --- |
| 2,283,240 | Trinkle | June 19, 1942 |
| 2,345,116 | Hanna | Mar. 28, 1944 |
| 2,261,644 | Cockrell | Nov. 4, 1941 |
| 2,172,313 | Young | Sept. 5, 1939 |
| 2,121,211 | Padva et al. | June 21, 1938 |